(12) United States Patent
Shi et al.

(10) Patent No.: US 7,914,212 B2
(45) Date of Patent: Mar. 29, 2011

(54) PROTECTING ASSEMBLY FOR A CAMERA

(75) Inventors: Zheng Shi, Shenzhen (CN);
Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 9 days.

(21) Appl. No.: 12/335,620

(22) Filed: Dec. 16, 2008

(65) Prior Publication Data
US 2009/0238555 A1 Sep. 24, 2009

(30) Foreign Application Priority Data
Mar. 19, 2008 (CN) .......................... 2008 1 0300632

(51) Int. Cl.
*G03B 17/00* (2006.01)
*G03B 17/02* (2006.01)
(52) U.S. Cl. ........................................ 396/448; 396/535

(58) Field of Classification Search .................. 396/448, 396/535, 544, 25–29, 419, 427; 348/373–376, 348/81
See application file for complete search history.

(56) References Cited

U.S. PATENT DOCUMENTS

| 6,665,455 B1* | 12/2003 | Ting ............................... 382/312 |
| 2004/0021792 A1* | 2/2004 | Yasui ............................. 348/373 |
| 2008/0044173 A1* | 2/2008 | Wang et al. .................... 396/448 |

FOREIGN PATENT DOCUMENTS

CN 2652049 A 10/2004

* cited by examiner

*Primary Examiner* — W. B. Perkey
*Assistant Examiner* — Minh Q Phan
(74) *Attorney, Agent, or Firm* — Steven M. Reiss

(57) ABSTRACT

A protecting assembly (20) for a camera used in a portable electronic device (10) is provided. The protecting assembly (20) includes a positioning member (14) fixed to a body section (11) of the electronic device (10) and a protecting member (16). The protecting member (16) is mounted on the positioning member (14) and arranged over the camera (12). A process for protecting a camera using the protecting assembly (20) is also provided.

11 Claims, 3 Drawing Sheets

PROTECTING ASSEMBLY FOR A CAMERA

BACKGROUND

1. Field of the Invention

The present invention relates to a protecting assembly for a camera and, particularly, to a protecting assembly for a camera used in a portable electronic assembly.

2. Description of Related Art

With the ongoing development of technologies, portable electronic assemblies with cameras have become widely used.

A typical portable electronic assembly includes a camera and a cover covering the camera. A portion of the camera may protrude from a body of the portable electronic assembly. The cover is made of transparent materials, arranged over the camera to protect the camera from damage (e.g., water or dust).

However, covers increase the size of the portable electronic assembly, which can be inconvenient.

Therefore, there is room for improvement within the art.

BRIEF DESCRIPTION OF THE DRAWINGS

Many aspects of the protecting assembly for a camera can be better understood with reference to the following drawings. These drawings are not necessarily drawn to scale, the emphasis instead being placed upon clearly illustrating the principles of the present protecting assembly for a camera. Moreover, in the drawings like reference numerals designate corresponding parts throughout the several views.

DETAILED DESCRIPTION OF EXEMPLARY EMBODIMENTS

The present protecting assembly for a camera is suitable for portable electronic assemblies, such as mobile phone terminals, digital cameras, and etc.

Figure 1:
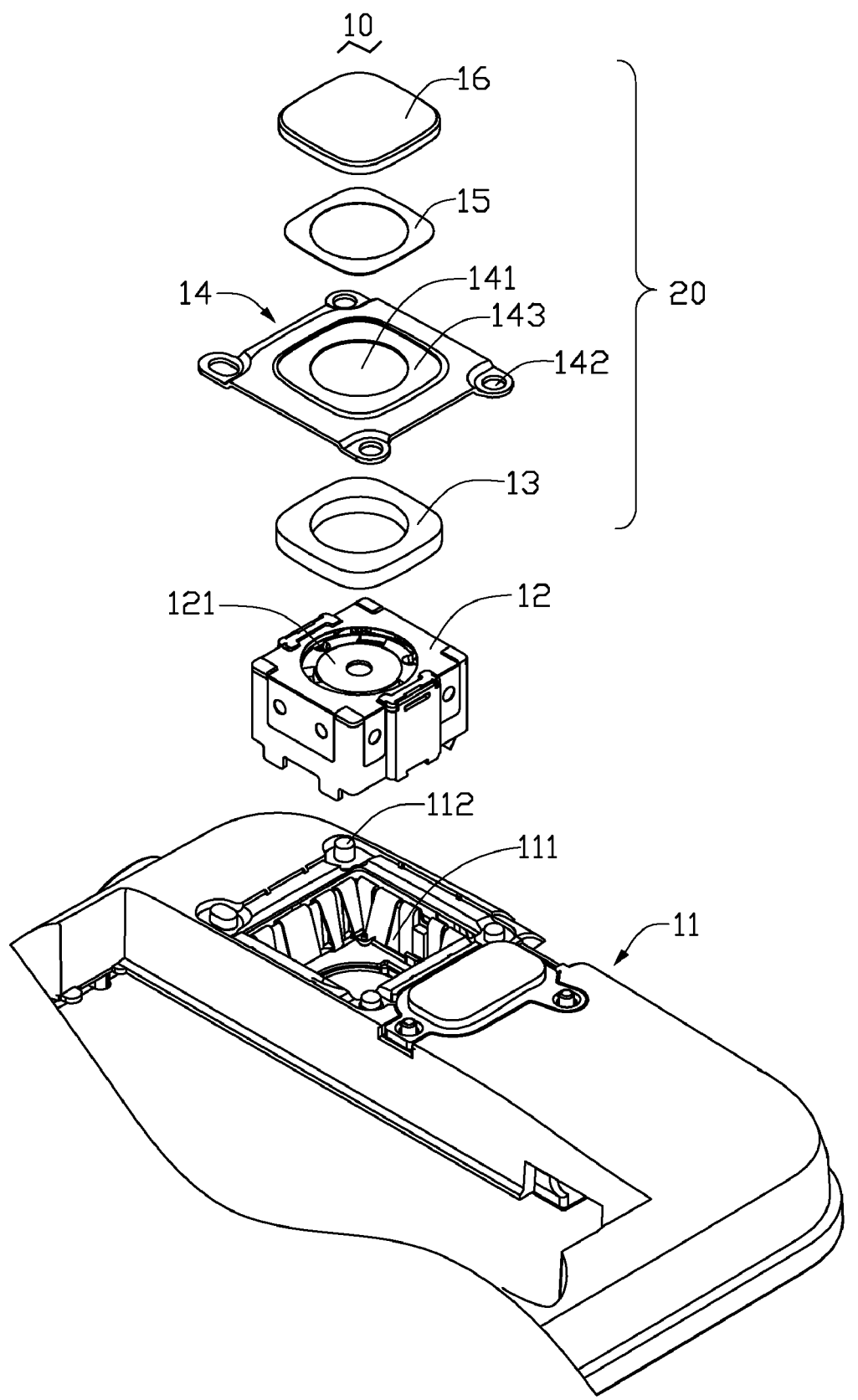
FIG. 1 is an exploded, isometric view of a protecting assembly for a camera, in accordance with an exemplary embodiment.
Figure 2:
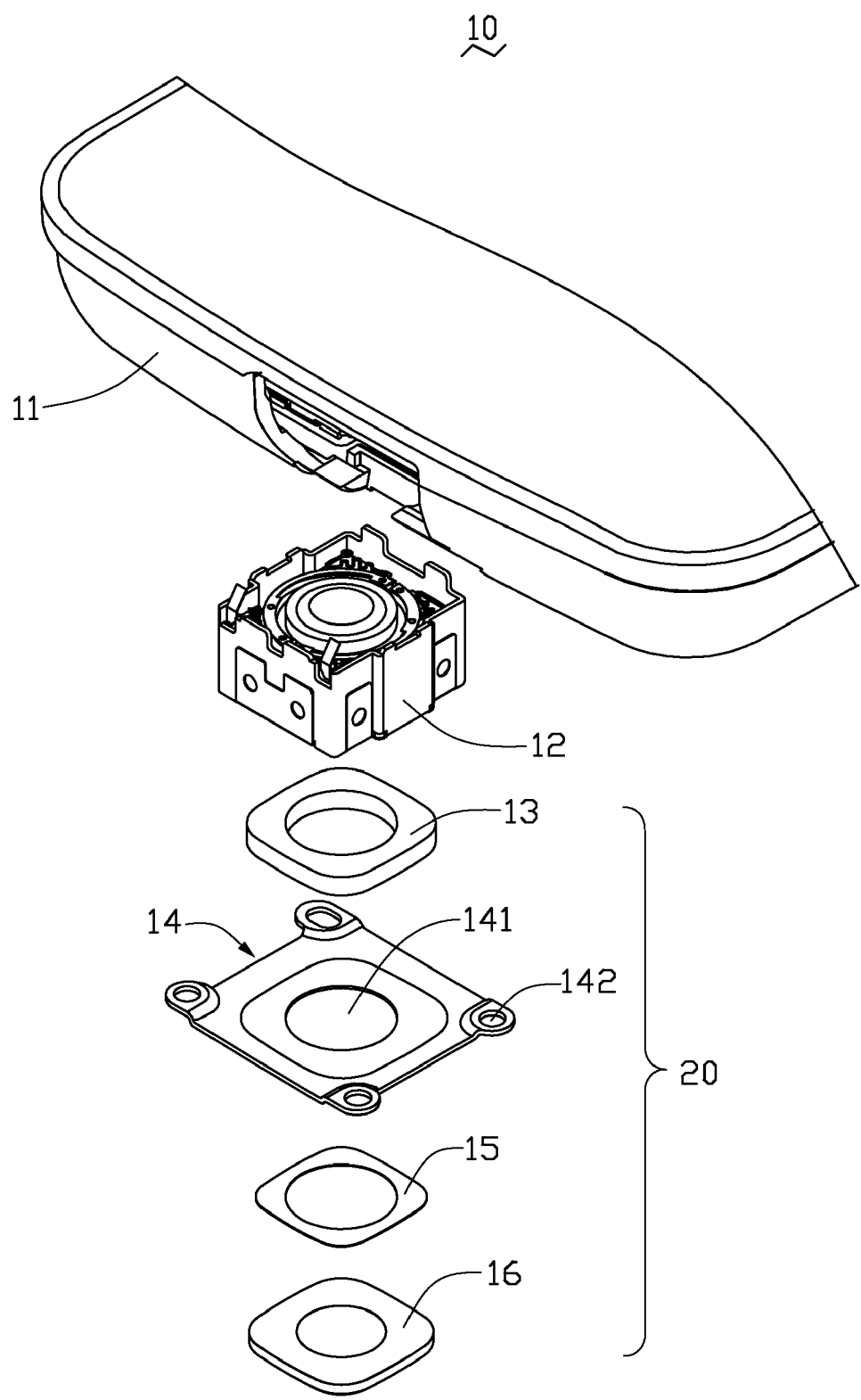
FIG. 2 is another exploded, isometric view of a protecting assembly for a camera shown in FIG. 1.
Figure 3:
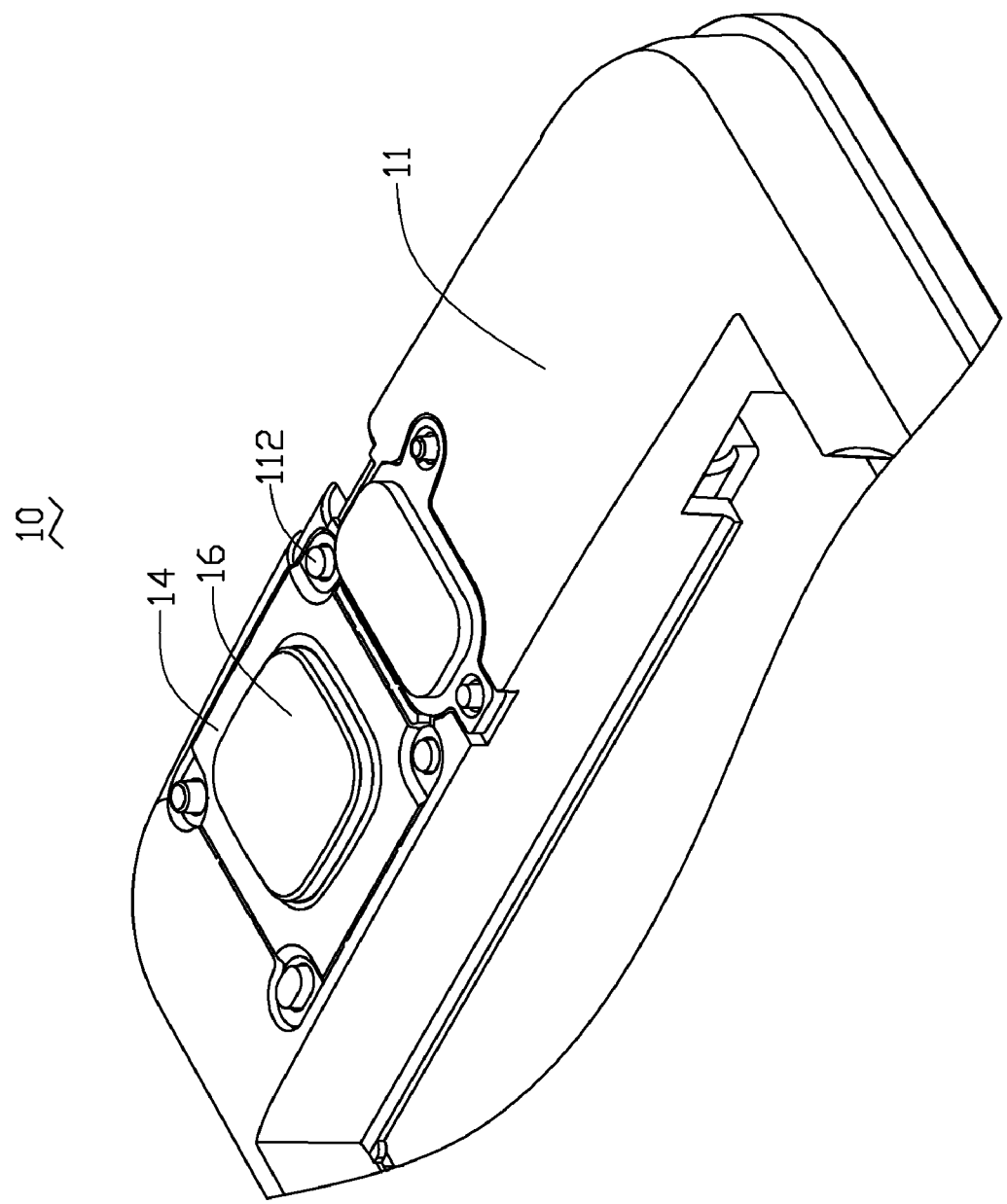
FIG. 3 is a partially isometric view of the protecting assembly for a camera shown in FIG. 1.

FIGS. 1 and 2 show a mobile phone 10. The mobile phone 10 includes a body section 11, a camera 12 and a protecting assembly 20 for the camera 12. The protecting assembly 20 includes a cushion 13, a positioning member 14, a double-sided adhesive 15 and a transparent protecting member 16.

The body section 11 defines a cavity 111 for receiving the camera 12. Positioning pole(s) 112 may protrude from any of the four corners surrounding the cavity 111. The body section 11 includes a printed circuit board (not shown) therein. The camera 12 is electrically connected to the printed circuit board.

The camera 12 includes an image sensor (not shown) and an incident plane 121 parallel to the image sensor. The image sensor converts optical images into electronic signals. The image sensor may be a charge coupled device (CCD) or a complementary metal-oxide semiconductor (CMOS).

The cushion 13 is made of soft materials, such as sponge, and configured for decreasing the pressure of the positioning member 14 against the camera 12.

The positioning member 14 is a plate including an opening 141, through which light transmits. The positioning member 14 further defines fastening hole(s) 142 corresponding to the positioning pole(s) 112 and a depressed region 143 surrounding the opening 141. The depressed region 143 may be formed by a process, such as etching. The depressed region 143 is configured for receiving the protecting member 16. The positioning member 14 may be made of metal materials e.g., iron or copper.

The double-sided adhesive 15 adheres the protecting member 16 to a wall of the depressed region 143. The protecting member 16 can be a transparent material, such as glass or a plastic sheet, configured for protecting the camera 12 from damaging elements.

In assembly, the camera 12 is inserted into the cavity 111. The camera 12 is electrically connected to the printed circuit board of the body section 11. The cushion 13 is arranged over the incident plane 121 of the camera 12. The protecting member 16 is adhered to a wall of the depressed region 143 via the double-sided adhesive 15. The positioning member 14 with the protecting member 16 is arranged over the cushion 13, and the fastening hole(s) 142 is aligned and engaged with the positioning pole(s) 112 to secure the positioning member 14 to the body section 11. Thus, the protecting member 16 covers the camera 12 to effectively protect the camera 12 from damaging elements, e.g., water or dust.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms, in which the appended claims are expressed.

What is claimed is:

1. A protecting assembly for a camera used in a portable electronic assembly, the electronic assembly comprising a body section comprising:
   a positioning member fixed to the body section of the electronic assembly; and
   a protecting member mounted on the positioning member and arranged over the camera;
   wherein, the body section defines a cavity receiving the entire camera; the positioning member defines at least one fastening hole, and at least one positioning pole protruding from the body section, the positioning pole being aligned and secured in the fastening holes.

2. The protecting assembly of a camera as claimed in claim 1, wherein the protecting member is adhered to the positioning member.

3. The protecting assembly for a camera as claimed in claim 1, wherein the positioning member defines a depressed region, configured for receiving the protecting member.

4. The protecting assembly for a camera as claimed in claim 1, wherein the positioning member defines an opening, through which light transmits.

5. The protecting assembly for a camera as claimed in claim 1, wherein the protecting member is a transparent material.

6. The protecting assembly for a camera as claimed in claim 1, further including a cushion between the camera and the protecting member, configured to decrease the pressure of the positioning member against the camera.

7. The protecting assembly for a camera as claimed in claim 1, wherein the positioning member is made of metal materials.

8. The protecting assembly for a camera as claimed in claim 1, wherein an image sensor of the camera is a charge coupled assembly or complementary metal-oxide semiconductor.

9. A process for protecting a camera, comprising:

providing a body section with a cavity and at least one positioning pole protruding therefrom;

positioning a camera entirely in the cavity;

fixing the position of the camera with a positioning member having a hole allowing light to pass through and at least one fastening hole;

positioning a protecting member over the positioning member to protect the camera from the damaging elements;

aligning and securing the at least one positioning pole in the fastening hole.

10. The process of claim 9, further comprising:

providing a cushion between the body section and the protecting member.

11. The process of claim 10, further comprising:

providing the cushion between the body section and the positioning member.

\* \* \* \* \*